United States Patent
Suau et al.

(10) Patent No.: US 8,263,699 B2
(45) Date of Patent: Sep. 11, 2012

(54) METHOD FOR DISPERSING ALKYD RESINS WITH ASSOCIATIVE POLYMERS IN WATER, FORMULATIONS THUS OBTAINED AND AQUEOUS PAINTS CONTAINING SAME

(75) Inventors: Jean-Marc Suau, Lucenay (FR); Denis Ruhlmann, Genay (FR); Olivier Guerret, La Tour de Salvagny (FR)

(73) Assignee: Coatex S.A.S, Genay (FR)

( * ) Notice: Subject to any disclaimer, the term of this patent is extended or adjusted under 35 U.S.C. 154(b) by 0 days.

(21) Appl. No.: 12/744,616

(22) PCT Filed: Feb. 25, 2009

(86) PCT No.: PCT/IB2009/000408
§ 371 (c)(1),
(2), (4) Date: May 25, 2010

(87) PCT Pub. No.: WO2009/115880
PCT Pub. Date: Sep. 24, 2009

(65) Prior Publication Data
US 2010/0267890 A1    Oct. 21, 2010

(30) Foreign Application Priority Data
Mar. 18, 2008    (FR) ..................................... 08 01450

(51) Int. Cl.
C09B 67/00    (2006.01)
C08L 67/00    (2006.01)
(52) U.S. Cl. ........................................ 524/502; 524/513
(58) Field of Classification Search .................. 524/556, 524/612; 526/317.1, 318.3, 318, 332, 333
See application file for complete search history.

(56) References Cited

U.S. PATENT DOCUMENTS
2006/0030662 A1 *   2/2006   Yang et al. ..................... 524/558
2008/0103248 A1 *   5/2008   Suau et al. ..................... 524/548

FOREIGN PATENT DOCUMENTS
FR        2 872 815        1/2006
WO      2008 080906       7/2008

* cited by examiner

Primary Examiner — Ling Choi
Assistant Examiner — Hui Chin
(74) Attorney, Agent, or Firm — Oblon, Spivak, McClelland, Maier & Neustadt, L.L.P.

(57) ABSTRACT

The invention consists of a method for dispersion in water of an alkyd resin, by means of a polymer having associative hydrophobic groups. The formulations obtained then enable a water-based alkyd paint to be manufactured, without having recourse to surfactants or solvents.

20 Claims, No Drawings

METHOD FOR DISPERSING ALKYD RESINS WITH ASSOCIATIVE POLYMERS IN WATER, FORMULATIONS THUS OBTAINED AND AQUEOUS PAINTS CONTAINING SAME

The invention concerns the sector of alkyd resins used to manufacture paints of the same name.

The expression "alkyd paints" refers either to polyesters resulting from the reaction of organic acids with polyols, or to alkyds known as urethane-alkyds resulting from the condensation of polyols with isocynate groups. In the present application, the terms alkyd "resin" and "polymer" will be used interchangeably. Historically, alkyd paints were manufactured from the 1950s in the presence of organic solvents, unlike water-based paints which were developed later.

However, the possibility of manufacturing water-based alkyd paints was envisaged very early, thereby anticipating consumers' demand for products free of organic solvents. This problem appears in the literature from the 1980s, as illustrated by document U.S. Pat. No. 4,497,933, which describes a method for manufacturing a water-based paint which is completely free of solvents, and which uses a very particular alkyd resin with an acid group content of between 15 and 40 mg KOH/g of resin, together with a high number of OH groupings. However, it is understood that such a method is very restrictive, in the sense that, by definition, it cannot be applied to all types of alkyd resin.

The skilled man in the art then developed techniques based on the use of surfactants and/or organic solvents (the latter then being used in lower quantities than for the formulation of solvent-based paints): their function is to solubilise the said alkyd resin in the presence of water, thus enabling the manufacture of a water-based alkyd paint. However, the presence of solvents and of surfactants in paint can impair the efficacy of the rheology modifiers commonly used in "traditional" water-based paints; these thickening agents remain just as essential in water-based alkyd paints, with a view to giving the latter the desired rheological profile.

In addition, international legislation—and more specifically European legislation—in the area of solvents and the disposal of volatile organic compounds (VOCs) is increasingly restrictive, as is emphasised by the recent document "advantages of water-based solvent-free alkyd emulsions for deco paints" (Sbornik Prispevku-Mezinarodni Konference-Naterovich Homtach-37$^{th}$-Cz. Rep., 22-24 May 2006, 92-104). With this regard, organic solvent-based paints can no longer be suitable for the skilled man in the art, from the standpoint of environmental regulations. Finally, the presence of solvents does not allow work in satisfactory conditions of safety for the user (risk of inflammation or intoxication, or allergic risks).

It is therefore necessary to develop new methods for preparing alkyd paints in an aqueous medium, free of solvents and surfactants, the general character of which would enable them to be applied to any alkyd resin, and which would be adapted to the use of rheology modifiers traditionally used in water-based paints. The Applicant has committed itself to this research effort, and has succeeded in developing a method for manufacturing such a paint, which is based on an original method of solubilisation of the alkyd resin in question.

Indeed, the dispersion in water of the said alkyd resin is initially accomplished by means of particular acrylic polymers having terminal hydrophobic groupings, with a character known as "associative". When these polymers are neutralised at sufficiently high pH (higher than 6), associative interactions are created between the hydrophobic groupings: these interactions demarcate fields which are all solvation cages for alkyd resin molecules. These solvation cages enable the alkyd polymer molecules to be dispersed in water through a mechanism known as "encapsulation". Such polymers are often described in the literature through the English acronym HASE, which stands for "hydrophobically altered soluble alkaline emulsion". Chemically, they can be defined on the basis of the monomers which constitute them: the first uses a (meth)acrylic acid base, the second is an ester of this acid, and the third is an associative hydrophobic monomer.

One of the Applicant's merits is to have succeeded in identifying and using the phenomenon of structuring of water using such polymers: by this means the dispersion of the alkyd resin by encapsulation is made possible. Such a use of these polymers is, in the state of our current knowledge, a new use of these objects which have been widely described in applications for paint (see documents FR 2 693 203, FR 2 872 815, FR 2 633 930), or again the sector of concretes (see the French patent application with filing number FR 07 00086, and not yet published on the date of filing of the present application).

Moreover, this technique is original in itself, in the sense that it is distinguished from the "traditional" techniques of encapsulation based either on "host" molecules such as the cyclodextrins (see document JP 2001 354515 on encapsulation of a micronised oil), or on interfacial polymerisation (see document U.S. Pat. No. 3,754,062 on the polymerisation of a urethane-epichlorhydrin-amine blend in the presence of a greasy substance), or on the use of carboxylated polymers with a base of one (meth)acrylic acid monomer and one acrylic ester monomer (in this case, the phenomenon of encapsulation is governed solely by the solubility of the polymer as a function of the pH; such polymers are commercially available under the names Eudragit™, Kollicoat™ or Eastacryl 30D™).

Thus, a first object of the invention is a method for the dispersion in water of at least one alkyd resin, characterised in that it comprises the steps of:
  a) blending at least one associative polymer consisting:
    of at least one monomer which is (meth)acrylic acid,
    of at least one monomer which is a (meth)acrylic ester,
    and of at least one associative hydrophobic monomer, with at least one alkyd resin and water,
  b) adjusting the pH of the blend obtained in step a) to a value greater than 6, preferentially 7, very preferentially 8,
  c) possibly precipitating the blend obtained after step b) through the adjustment of the pH to a value less than 6, preferentially 5, very preferentially 3.

Concretely, the constituent elements (resin, water, associative polymer) are introduced whilst stirring in a reactor; the order of introduction will be chosen by the skilled man in the art, notably according to the solubility in water of the resin to be encapsulated.

The formulation is accomplished by blending of its various constituent elements (water, alkyd resin, associative polymer) and then, according to a first embodiment, by adjusting the pH to a value greater than 6, preferentially 7, very preferentially 8.

According to this first embodiment the method according to the invention does not implement step c) of acidification.

In a second variant, step b) is followed by a reduction of the pH to a value of less than 6; there is then precipitation of the medium, which causes the structure of the associative polymer to collapse in on itself. Formation of a dispersion in the water of particles consisting of alkyd resin molecules occurs, which are trapped within the structure of the associative polymer. Such a dispersion is equally favourable for a complete solubilisation of the alkyd resin in water. The technical link providing the unity of the present invention is based on the presence, in both embodiments, of the 3 fundamental constituents which are the alkyd resin, water and the associative polymer.

Thus, in this second embodiment, the method according to the invention is also characterised in that it uses step c).

The method according to the invention is also characterised in that the pH is adjusted in step b) by means of a mineral or organic base.

The method according to the invention is also characterised in at the pH is adjusted in step c) by means of a moderately strong or strong acid.

The method according to the invention is also characterised in that the blend of step a) consists of 0.1% to 20%, preferentially 0.1% to 10%, and very preferentially 0.1% to 5% by dry weight of the said associative polymer, compared to its total weight.

The method according to the invention is also characterised in that the blend of step a) consists of at least 5%, preferentially of at least 20%, very preferentially of at least 30%, and extremely preferentially of at least 35% by weight of at least one alkyd resin, and at most of 70% by weight of at least one alkyd resin, compared to its total weight.

The method according to the invention is also characterised in that, with regard to the associative polymer, the monomer which is a (meth)acrylic ester is chosen preferentially from among ethyl acrylate, butyl acrylate, methyl methacrylate and their blends.

The method according to the invention is also characterised in that, with regard to the associative polymer, the monomer which is an associative hydrophobic monomer has the general formula (I):

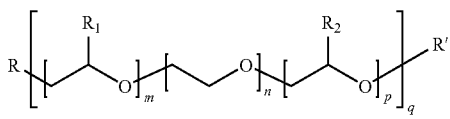

where:
m, n, p and q are integers and m, n and p are less than 150,
q is greater than 0 and at least one integer from among m, n and p is non-zero,
R has at least one polymerisable vinylic group,
$R_1$ and $R_2$ are identical or different and represent hydrogen atoms or alkyl groupings,
R' is a hydrophobic grouping having at least 6 and at most 36 carbon atoms, preferentially at least 16 and at most 24 carbon atoms, and very preferentially at least 18 and at most 22 carbon atoms.

The method according to the invention is also characterised in that the alkyd resin is chosen from among the polyester, polyurethane, polyurethane-polyester resins and their blends.

Another object of the invention consists of the water-based formulations obtained by the method according to the invention.

These water-based formulations are characterised in that they include water, at least one alkyd resin, and at least one associative polymer consisting:
of at least one monomer which is (meth)acrylic acid,
of at least one monomer which is a (meth)acrylic ester,
and of at least one associative hydrophobic monomer.

These water-based formulations, in a first embodiment in which they are obtained by the method of the invention without implementing step c) of precipitation, are also characterised in that their pH is greater than 6, preferentially 7, very preferentially 8.

These water-based formulations, in a second embodiment in which they are obtained by the method of the invention implementing step c) of precipitation, are also characterised in that their pH is less than 6, preferentially 5, very preferentially 3.

These water-based formulations are also characterised in that they also contain a mineral or organic base.

These water-based formulations, in a second embodiment in which they are obtained by the method of the invention implementing step c) of precipitation, are also characterised in that they contain a moderately strong to strong acid.

These water-based formulations are also characterised in that they consist of 0.1% to 20%, preferentially 0.1% to 10%, very preferentially 0.1% to 5%, by dry weight of the said associative polymer, compared to their total weight.

These water-based formulations are also characterised in that they consist of at least 5%, preferentially of at least 20%, very preferentially of at least 30%, and extremely preferentially of at least 35%, by weight of at least one alkyd resin, and at most of 70% by weight of at least one alkyd resin, compared to their total weight.

These water-based formulations are also characterised in that, with regard to the associative polymer, the monomer which is a (meth)acrylic ester is chosen preferentially from among ethyl acrylate, butyl acrylate, methyl methacrylate and their blends.

These water-based formulations are also characterised in that, with regard to the associative polymer, the monomer which is an associative hydrophobic monomer has the general formula (I):

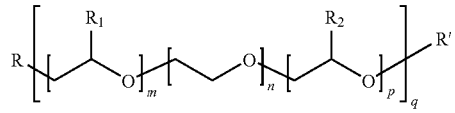

where:
m, n, p and q are integers and m, n and p are less than 150,
q is greater than 0 and at least one integer from among m, n and p is non-zero,
R has at least one polymerisable vinylic group,
$R_1$ and $R_2$ are identical or different and represent hydrogen atoms or alkyl groupings,
R' is a hydrophobic grouping having at least 6 and at most 36 carbon atoms, preferentially at least 16 and at most 24 carbon atoms, and very preferentially at least 18 and at most 22 carbon atoms.

These water-based formulations are also characterised in that the alkyd resin is chosen from among the polyester, polyurethane, polyurethane-polyester resins and their blends.

Another object of the invention is the use of the abovementioned water-based formulations, for the manufacture of paints, lacquers, varnishes or wood stained. In concrete terms, the skilled man in the art produces these products by blending the various additives which are traditionally used in the composition of a paint, a lacquer, a varnish or timber preservative, in which the alkyd resin is introduced in the form of the abovementioned water-based formulations.

A final object of the invention lies in the paints, lacquers, varnishes and wood stained, characterised in that they contain a water-based alkyd resin formulation according to the invention.

EXAMPLES

Examples 1 and 2 illustrate respectively the manufacture of monomers able to be used according to the invention, and the manufacture (from these monomers) of water-soluble associative polymers able to be used according to the invention.

Example 1

Synthesis of Monomers According to the Invention

Method a: Synthesis of Methacrylate Monomer
In a 1-liter reactor the following are weighed:
  400 grams of condensed behenic alcohol with 25 moles of dissolved ethylene oxide,
  0.0994 grams of allo-ocimene,
  43.75 grams of methacrylic anhydride.

The blend is heated to 82° C.±2° C. and firing is continued for 3 hours at this temperature. The macromonomer obtained is then diluted with 396 g of methacrylic acid in order to obtain a liquid solution at ambient temperature.

Method b: Synthesis of Urethane Monomer
In a first step, a pre-condensate is obtained by weighing in an erlenmeyer flask:
  13.726 grams of diisocyanate toluene,
  36.1 grams of ethyl acrylate,
  0.077 grams of allo-ocimene,
  0.198 grams of dibutyltin dilaurate.

10.257 grams of ethylene glycol methacrylate and 10 grams of ethyl acrylate are then weighed in a dropping funnel. The content of this funnel is poured into the erlenmeyer flask in 20 minutes at a temperature below 35° C., and it is left to react for 30 minutes.

In a second step, the condensation is accomplished by weighing 132 grams of tri-styryl-phenol condensate with 25 moles of ethylene oxide in a 1,000 ml reactor which will be kept dissolved at 65° C. The pre-condensate is then poured in 20 minutes at 65° C. over this alcohol, and is then fired for 2 hours at 65° C. Finally, the blend is diluted with 15.5 grams of ethyl acrylate and 84.6 grams of bipermuted water in order to obtain a liquid at ambient temperature.

Method c: Synthesis of Hemimaleate Monomer
In a 1-liter reactor the following are weighed:
  400 grams of alcohol branched with 32 carbon atoms condensed with 25 moles of dissolved ethylene oxide,
  0.0994 grams of allo-ocimene,
  25.3 grams of maleic anhydride.

The blend is heated to 82° C.±2° C. and firing is continued for 3 hours. The macromonomer then obtained is diluted with 425 g of methacrylic acid in order to obtain a liquid solution at ambient temperature.

Example 2

Synthesis of Associative Water-Soluble Polymers

Method A
In a 1-liter reactor, 280 grams of bipermuted water and 3.89 grams of sodium dodecyl sulphate are weighed. The base of the tank is then heated to 82° C.±2° C.

During this time, a pre-emulsion is prepared by weighing the following in a beaker:
  112.4 grams of bipermuted water,
  2.1 grams of sodium dodecyl sulphate,
  80.6 grams of methacrylic acid;
  146.1 grams of ethyl acrylate,
  55.6 grams of a solution of macromonomer as described in method a).

0.85 grams of ammonium persulphate is then weighed, diluted in 10 grams of bipermuted water for the first catalyst, and 0.085 grams of sodium metabisulphite diluted in 10 grams of bipermuted water for the second catalyst. When the base of the tank is at the required temperature both catalysts are added, and polymerisation is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the polymer obtained in this manner is filtered.

Method B
In a 1-liter reactor, 280 grams of bipermuted water and 3.89 grams of sodium dodecyl sulphate are weighed. The base of the tank is then heated to 82° C.±2° C.

During this time, a pre-emulsion is prepared by weighing the following in a beaker:
  334 grams of bipermuted water,
  3.89 grams of sodium dodecyl sulphate,
  0.92 grams of dodecylmercaptan,
  80.6 grams of methacrylic acid;
  160.55 grams of ethyl acrylate,
  60.4 grams of the solution of methacrylurethane described in method b).

0.33 grams of ammonium persulphate is then weighed, diluted in 10 grams of bipermuted water for the first catalyst, and 0.28 grams of sodium metabisulphite diluted in 10 grams of bipermuted water for the second catalyst. When the base of the tank is at the required temperature both catalysts are added, and polymerisation is effected for 2 hours at 84° C.±2° C., with simultaneous addition of the pre-emulsion. The pump is rinsed with 20 grams of bipermuted water, and is fired for 1 hour at 84° C.±2° C. Finally it is cooled to ambient temperature and is filtered.

Method C
This method is identical to method B, with the difference that in this case the dodecylmercaptan is not used in the first weighing step.

Method D
This method is identical to method A, with the difference that 0.9 grams of dodecylmercaptan is introduced in the initial weighing step into the beaker.

Example 3

This example illustrates the method according to the invention of dispersing an alkyd resin, in which the step of precipitation of the medium has been implemented. It also illustrates the water-based formulation obtained in this manner, and its use for manufacturing a paint, notably in the presence of thickening agents traditionally used in standard water-based paints.

Test No 1-a
This test illustrates the manufacture of a water-based formulation of an alkyd resin in the presence of an associative hydrophobic polymer.

The first step is to weigh 16.5 grams of a hydrophobic associative polymer in the form of a 30% aqueous dispersion of dry matter; the polymer consists of (expressed as a % by weight of each of the monomers):
  a) 37.4% of methacrylic acid,
  b) 54.3% of ethyl acrylate,
  c) 8.3% of a monomer of formula (I), in which:
    m=p=0, n=25, q=1, R is the methacrylate group,
$R_1$ and $R_2$ are identical and represent hydrogen,
R' is a branched alkyl group consisting of 16 carbon atoms (hexyldecylic).

150 grams of an alkyd resin sold by the company CRAY VALLEY™ with the brand Synolac™ 6868 WD75 is then introduced into 182 grams of water; this resin contains solvents. 16.5 grams of the associative hydrophobic polymer, as described above, is then introduced into the blend.

Finally, the pH of the blend is adjusted using sodium hydroxide to a value equal to 8.5.

The formation of a creamy blend is observed; the pH is then reduced to 5.8 using a 4% phosphoric acid solution. A fluid resin dispersion in an aqueous medium is then obtained.

The size of these dispersions was determined by dynamic diffusion of light using a Zetasizer™ nano S90 sold by the company MALVERN™; an average value of 1,400 nm is obtained.

Test 1-b

This test illustrates the method according to the invention, through the manufacture of a water-based alkyd paint, which manufacturing process uses the water-based formulation obtained for test 1-a.

In concrete terms, the said paint is produced by blending various constituent elements, the proportions of which are given in table 1.

TABLE 1

| Constituents | Mass (grams) |
| --- | --- |
| Added water | 120 |
| Coadis ™ BR85 | 8 |
| Acticide MBS | 2 |
| AMP 95 | 2 |
| Tego ™ 1488 | 1 |
| TiO2 Kronos ™ 2310 | 268 |
| Water-based formulation according to test 1-1 | 600 |
| Octa-soligen ™ 144 Aqua | 10 |

Coadis™ BR85 is a dispersing agent sold by the company COATEX™.

Tego™ 1488 is an antifoaming agent sold by the company TEGO CHEMIE™.

TiO2 Kronos™ 2310 designates titanium dioxide sold by the company KRONOS™.

Octa-soligen™ 144 Aqua designates a siccative agent sold by the company BORCHERS™.

For this paint, a number of rheological measurements were made at 25° C., initially and subsequently after 24 hours, using the techniques well known to the skilled man in the art. The ICI™, Stormer™, and Brookfield™ viscosities were notably determined at 10 and 100 revolutions per minute. The values obtained, reported in table 2, match typical values in rheology for an easily usable and applicable paint, i.e. one with satisfactory stability in the pot, without sedimentation or excessive phase separation, a satisfactory loading of the application tool (roller or brush), and a satisfactory quality of application (brush, roller, spraying). The change of viscosity between t=0 and t=24 is typical for that found for most water-based paints.

TABLE 2

| Viscosities | t = 0 | t = 24 hours |
| --- | --- | --- |
| ICI ™ | 0.8 | 0.9 |
| Stormer ™ (KU) | 96 | 114 |
| Brookfield ™ (mPa · s) (10 rpm/100 rpm) | 21,400/3,230 | 33,700/4,810 |

Test 1-c

To 300 grams of paint produced using test 1-b was added 10 grams of an associative thickening agent sold by the company COATEX™, and intended for water-based paints, which is either Coapur™ XS 22, or Coapur™ 2025. The same rheological measurements as for test 1-b were made at instant t=0 and were reported in table 3.

TABLE 3

| Viscosities | Coapur ™ XS 22 | Coapur 2025 |
| --- | --- | --- |
| ICI ™ | 2.0 | 1.4 |
| Stormer ™ (KU) | 141 | 116 |
| Brookfield ™ (mPa · s) (10 rpm/100 rpm) | 44,200/9,870 | 34,100/5,340 |

The values of table 3 shows that thickening agents normally used in standard water-based paints enable the water-based alkyd paint according to the invention to be thickened effectively. This demonstrates after the event that success has indeed been obtained in perfectly dispersing the alkyd resin in water, which has ultimately enabled a water-based alkyd paint to be obtained. The alkyd resin solubilised in this manner in water also has the same potential for developing interactions known as associative interactions with thickening agents which have been hydrophobically modified for water-based products, enabling the main application properties of the paint to be controlled (high build, control of speed of application, resistance to projection, flow). The effectiveness of these interactions is notably quantifiable through the increase of the Stormer and ICI viscosities.

Example 4

Test No 2-a

This test illustrates the manufacture of a water-based formulation of a solvent-free alkyd resin in the presence of an associative hydrophobic polymer.

The first step is to weigh in a 1-L reactor fitted with a mechanical stirring mechanism, a heating system and a distillation device 16.5 grams of an associative hydrophobic polymer in the form of an aqueous dispersion with 30% dry matter; the polymer consists (expressed as a % by weight of each of the monomers) of:
  a) 37.4% of methacrylic acid,
  b) 54.3% of ethyl acrylate,
  c) 8.3% of a monomer of formula (I), in which:
    m=p=0, n=25, q=1,
    R is the methacrylate group,
    $R_1$ and $R_2$ are identical and represent hydrogen,
    R' is a branched alkyl group consisting of 16 carbon atoms (hexyldecylic).

150 grams of an alkyd resin sold by the company CRAY VALLEY™ with the brand Synolac™ 6868 WD75 is then introduced into 182 grams of water.

16.5 grams of the associative hydrophobic polymer, as described above, is then introduced into the blend. 48 ml of water and 40 ml of organic solvent is then distilled at atmospheric pressure until the temperature of the blend reaches 100° C.

Finally, the pH of the blend is adjusted using sodium hydroxide to a value equal to 8.5, and it is left for approximately 15 minutes, whilst stirring.

The formation of a creamy blend is observed; the pH is then reduced to 5.8 using a 4% phosphoric acid solution. A fluid resin dispersion in an aqueous medium is then obtained.

The size of these dispersions was determined by dynamic diffusion of light using a Zetasizer™ nano S90 sold by the company MALVERN™; an average value of 1,200 nm is obtained.

Test 2-b

This test illustrates the method according to the invention, through the manufacture of a water-based alkyd paint, which manufacturing process uses the water-based formulation obtained for test 2-a.

In concrete terms, the said paint is produced by blending various constituent elements, the proportions of which are given in table 4.

TABLE 4

| Constituents | Mass (grams) |
| --- | --- |
| Added water | 120 |
| Coadis ™ BR85 | 8 |
| Acticide MBS | 2 |
| AMP 95 | 2 |
| Tego ™ 1488 | 1 |
| TiO2 Kronos ™ 2310 | 268 |
| Water-based formulation according to test 2-1 | 600 |
| Octa-soligen ™ 144 Aqua | 10 |

The same rheological measurements as those described above are made on the paint obtained; these are reported in table 5.

TABLE 5

| Viscosities | t = 0 |
| --- | --- |
| ICI ™ | 1.2 |
| Stormer ™ (KU) | 115 |
| Brookfield ™ (mPa · s) (10 rpm/100 rpm) | 22,800/6,180 |

Values are obtained characteristic of a paint which is easy to use and apply, with a satisfactory stability in the pot, without sedimentation or excessive phase separation, satisfactory loading of the application tool (roller, brush), and satisfactory application quality (brush, roller, spraying).

Test 2-c

To 337 grams of paint produced using test 2-b was added 9 grams of an associative thickening agent sold by the company COATEX™, and intended for water-based paints, namely Coapur™ XS 22. The same rheological measurements as for test 2-b were made at instant t=0 and reported in table 6.

TABLE 6

| Viscosities | Coapur ™ XS 22 |
| --- | --- |
| ICI ™ | 2.4 |
| Stormer ™ (KU) | 140 |
| Brookfield ™ (mPa · s) (10 rpm/100 rpm) | 16,700/7,710 |

The values of table 6 shows that the thickening agent normally used in standard water-based paints enables the water-based alkyd paint according to the invention to be thickened effectively. This demonstrates after the event that success has indeed been obtained in perfectly dispersing the alkyd resin in water, which has ultimately enabled a water-based alkyd paint to be obtained.

The invention claimed is:

1. A method, comprising:
   (a) blending a polymer comprising, in polymerized form:
      (meth)acrylic acid,
      a (meth)acrylic ester, and
      at least one hydrophobic monomer,
   with at least one alkyd resin and water to obtain a blend;
   (b) adjusting the pH of the blend to a value greater than 6, to obtain a dispersion of the blend in the water; and then
   (c) precipitating the dispersion by adjusting the pH to a value less than 6.

2. The method according to claim 1, wherein the pH in (b) is adjusted by adding a mineral base or an organic base.

3. The method according to claim 1, wherein the pH in (c) is adjusted in said precipitating by adding a moderately strong acid or a strong acid.

4. The method according to claim 1, wherein the blend comprises 0.1% to 20% by dry weight of the polymer, compared to its total weight.

5. The method according to claim 1, wherein the blend comprises at least 5% by weight of the at least one alkyd resin, and at most of 70% by weight of the at least one alkyd resin, compared to its total weight.

6. The method according to claim 1, wherein the (meth) acrylic ester is selected from the group consisting of ethyl acrylate, butyl acrylate, methyl methacrylate, and mixtures thereof.

7. The method according to claim 1, wherein the hydrophobic monomer has a formula (I):

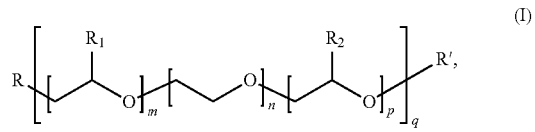

wherein:
   m, n, p, and q are integers, wherein m, n, and p are less than 150, q is greater than 0, and at least one integer from among m, n, and p is non-zero;
   R has at least one polymerisable vinylic group;
   $R_1$ and $R_2$ are identical or different and represent hydrogen atoms or alkyl groupings; and
   R' is a hydrophobic grouping having at least 6 and at most 36 carbon atoms.

8. The method according to claim 1, wherein the alkyd resin is a polyester resin, polyurethane resin, or polyurethane-polyester resin or mixtures thereof.

9. A water-based formulation consisting essentially of water, at least one alkyd resin, and at least one polymer comprising:
   (meth)acrylic acids;
   a (meth)acrylic ester; and
   at least one hydrophobic monomer.

10. The water-based formulation according to claim 9, having a pH of greater than 6.

11. The water-based formulation according to claim 9, having a pH of less than 6.

12. The water-based formulation according to claim 9, comprising a mineral base or an organic base.

13. The water-based formulation according to claim 9, comprising a moderately strong to strong acid.

14. The water-based formulation according to claim 9, comprising 0.1% to 20%, by dry weight of the polymer, compared to their total weight.

15. The water-based formulation according to claim 9, comprising at least 5%, by weight of the at least one alkyd resin, and at most of 70% by weight of the at least one alkyd resin, compared to their total weight.

16. The water-based formulation according to claim 9, wherein the (meth)acrylic ester is selected from the group consisting of ethyl acrylate, butyl acrylate, methyl methacrylate, and mixtures thereof.

17. The water-based formulation according to claim 9, wherein the hydrophobic monomer has a formula (I):

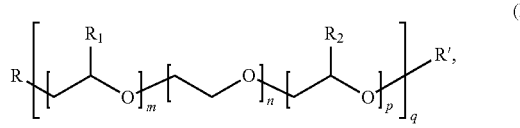

(I)

wherein:
- m, n, p, and q are integers, wherein m, n, and p are less than 150, q is greater than 0, and at least one integer from among m, n, and p is non-zero;
- R has at least one polymerisable vinylic group;
- $R_1$ and $R_2$ are identical or different and represent hydrogen atoms or alkyl groupings; and
- R' is a hydrophobic grouping having at least 6 and at most 36 carbon atoms.

18. The water-based formulation according to claim 9, wherein the alkyd resin is selected from the group consisting of polyester resin, polyurethane resin, polyurethane-polyester resin, and mixtures thereof.

19. A method, comprising:
(a) blending a polymer comprising:
   (meth)acrylic acid,
   a (meth)acrylic ester, and
   at least one hydrophobic monomer,
   with at least one alkyd resin and water to obtain a blend; and
(b) adjusting the pH of the blend to a value greater than 6, to obtain a dispersion of the blend in the water,
wherein the blend comprises at least 35% by weight of the at least one alkyd resin, and at most of 70% by weight of the at least one alkyd resin, compared to its total weight.

20. A water-based formulation having a pH of less than 6, comprising water, at least one alkyd resin, and at least one polymer comprising:
(meth)acrylic acid;
a (meth)acrylic ester; and
at least one hydrophobic monomer.

* * * * *